A. HANSEN.
CLAMPING DEVICE.
APPLICATION FILED DEC. 1, 1909.
973,654.
Patented Oct. 25, 1910.
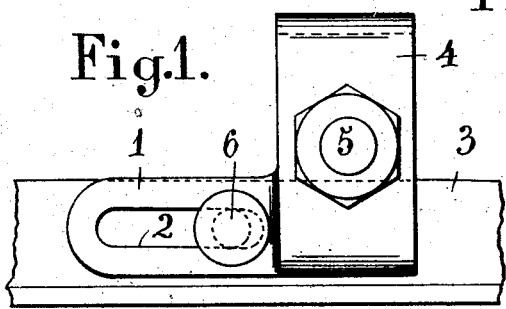
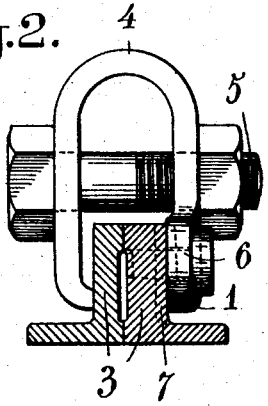
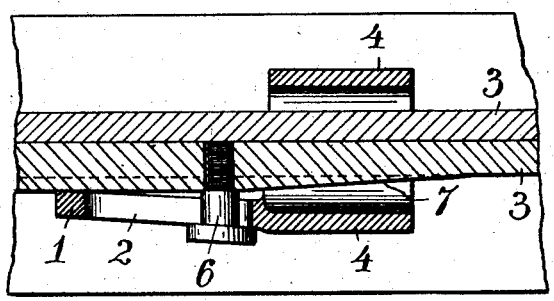
Witnesses
Inventor
Amund Hansen

UNITED STATES PATENT OFFICE.

AMUND HANSEN, OF CHRISTIANIA, NORWAY, ASSIGNOR TO HANS STUB, OF CHRISTIANIA, NORWAY, AND THEODOR QVILLER, OF LILLESTRÖMMEN, NORWAY.

CLAMPING DEVICE.

973,654.  Specification of Letters Patent.  Patented Oct. 25, 1910.

Application filed December 1, 1909. Serial No. 530,877.

*To all whom it may concern:*

Be it known that I, AMUND HANSEN, a subject of the King of Norway, residing at Christiania, Norway, have invented certain new and useful Improvements in Clamping Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to means for holding together two adjoining flanges of machinery and has for its object to procure simple means, whereby flanges may be quickly and easily connected and disconnected. To this end I make use of a clamping device of a peculiar arrangement, the nature of which will be explained with reference to the annexed drawing, in which I have shown one form of clamp embodying my invention.

Figure 1 is a side view and Fig. 2 an end view of the clamping device as applied on two adjoining flanges. Fig. 3 is a horizontal section through the flanges and the device.

3 designates the flanges to be united and 4 a U-formed clamp, the gap of which may be regulated by way of the screw-bolt 5. One of the legs of the clamp has a lateral extension 1 with a slot 2; through this slot projects a pin 6, screwed or otherwise secured to the flange. One of the flanges is provided with a wedge shaped thickening as indicated at 7.

The drawing shows the clamping device, after it has been tightened up; when it is to be loosened, it is moved to the right by striking on it with a hammer, so that the pin 6 will be in the other end of the slot 2, whereupon the clamp is swung outward.

Usually screwbolts are used to unite flanges; but it takes considerable time to loosen them and to again put them in place, especially when they have become rusty. Moreover screwbolts are liable to get loose when exposed to shakings. The screwbolt 5 in the device described need never be loosened, when once set, and can be plugged so as not to be able to get loose.

By means of this clamping device flanges on machinery can be united so as to be absolutely guarded against getting loose, because the clamp can not lose its hold before it has been moved a considerable distance along the flange. The clamping device is therefore especially applicable to machinery exposed to shakings and to moisture for instance the strainer frames in strainers for pulp and like apparatus.

Claim.

A flange connection comprising two flanges one of which is provided with a wedge-shaped side portion, clamping legs adapted to straddle said flanges, one of said legs having a lateral longitudinally slotted extension adapted to engage said wedge-shaped portion, a regulating screw in said legs, and a pin projecting through said slot adapted to take into the flange provided with said wedge-shaped portion, whereby said flanges are clamped and released by moving the legs longitudinally of the flanges.

In testimony that I claim the foregoing as my invention, I have signed my name in presence of two subscribing witnesses.

AMUND HANSEN.

Witnesses:
 JOH VAATER,
 AUG. OLSEN.